United States Patent
Nashiki et al.

(10) Patent No.: US 9,428,625 B2
(45) Date of Patent: Aug. 30, 2016

(54) TRANSPARENT CONDUCTIVE FILM, METHOD FOR PRODUCTION THEREOF AND TOUCH PANEL THEREWITH

(75) Inventors: Tomotake Nashiki, Ibaraki (JP); Hideo Sugawara, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 1598 days.

(21) Appl. No.: 12/250,645

(22) Filed: Oct. 14, 2008

(65) Prior Publication Data

US 2009/0104440 A1    Apr. 23, 2009

(30) Foreign Application Priority Data

Oct. 22, 2007   (JP) ................. 2007-274045

(51) Int. Cl.
*B32B 7/12* (2006.01)
*C23C 14/34* (2006.01)
*C08J 7/04* (2006.01)
*G06F 3/045* (2006.01)
*G02F 1/1333* (2006.01)

(52) U.S. Cl.
CPC ............ *C08J 7/045* (2013.01); *G06F 3/045* (2013.01); *G02F 1/13338* (2013.01); *G02F 2001/133331* (2013.01); *G02F 2202/022* (2013.01); *G02F 2202/09* (2013.01); *G02F 2202/16* (2013.01); *Y10T 428/265* (2015.01)

(58) Field of Classification Search
CPC .... C08J 7/045; G06F 3/045; G02F 1/13338; G02F 2202/022; G02F 2202/16; G02F 2202/09; G02F 2001/133331; Y10T 428/265
USPC .............. 178/18.01–18.03; 345/173–177; 428/141
See application file for complete search history.

(56) References Cited

U.S. PATENT DOCUMENTS

| | | |
|---|---|---|
| 6,136,444 A | 10/2000 | Kon et al. |
| 2003/0194551 A1 | 10/2003 | Sasa et al. |
| 2005/0173706 A1 | 8/2005 | Sasa et al. |
| 2005/0269707 A1 | 12/2005 | Nashiki et al. |
| 2006/0225999 A1 | 10/2006 | Fukawa et al. |
| 2006/0285213 A1 | 12/2006 | Kanada et al. |

(Continued)

FOREIGN PATENT DOCUMENTS

| | | |
|---|---|---|
| CN | 1353450 A | 6/2002 |
| EP | 0726579 A2 | 8/1996 |

(Continued)

OTHER PUBLICATIONS

English Machine Translation of JP 2005-093318, Apr. 7, 2005.*

(Continued)

*Primary Examiner* — Nancy Johnson
(74) *Attorney, Agent, or Firm* — Westerman, Hattori, Daniels & Adrian, LLP (57) ABSTRACT

There is provided a transparent conductive film having a transparent conductor layer with a high level of pen input durability and high-temperature, high-humidity reliability. The transparent conductive film of the present invention is a transparent conductive film, comprising: a transparent film substrate; a transparent conductor layer that is provided on one side of the transparent film substrate and has a thickness d of 15 nm to 35 nm and an average surface roughness Ra of 0.37 nm to 1 nm; and at least a single layer of an undercoat layer interposed between the transparent film substrate and the transparent conductor layer.

10 Claims, 2 Drawing Sheets

(56) References Cited

U.S. PATENT DOCUMENTS

| | | | |
|---|---|---|---|
| 2007/0091074 A1 | 4/2007 | Nashiki et al. | |
| 2007/0221494 A1 | 9/2007 | Yamada et al. | |
| 2007/0224412 A1 | 9/2007 | Hara et al. | |
| 2009/0284475 A1 | 11/2009 | Nashiki et al. | |

FOREIGN PATENT DOCUMENTS

| | | | |
|---|---|---|---|
| JP | 7-335030 A | 12/1995 | |
| JP | 08-064034 A | 3/1996 | |
| JP | 11250764 | 9/1999 | |
| JP | 11-286066 A | 10/1999 | |
| JP | 2002163933 | 6/2002 | |
| JP | 2003-297150 A | 10/2003 | |
| JP | 2004-193008 A | 7/2004 | |
| JP | 2004213990 | 7/2004 | |
| JP | 2005-093318 A | 4/2005 | |
| JP | 2005-268616 A | 9/2005 | |
| JP | 2006-019239 A | 1/2006 | |
| JP | 2007-42283 A | 2/2007 | |
| JP | 2007-42284 A | 2/2007 | |
| JP | 2007-103348 A | 4/2007 | |
| KR | 2007-0009724 A | 1/2007 | |
| TW | 200614279 | 8/1994 | |
| WO | 03/012799 A1 | 2/2003 | |
| WO | 2004/105055 A1 | 2/2004 | |

OTHER PUBLICATIONS

Korean Office Action dated Oct. 29, 2010, issued in corresponding Korean Patent Application No. 10-2008-0102337.

European Search Report dated Feb. 17, 2010, issued in corresponding European Patent Application No. 08018392.4.

Shigesato Y. et al.; "Early stages of ITO deposition on glass or polymer substrates"; Vacuum, vol. 59, (2000), pp. 614-621, XP002504885.

Database WPI Week 200321, Thomson Scientific, London, GB; An 2003-222109, XP002567623 (Partial translation of WO 03/012799 listed in Cite No. 2 of Foreign Patent Documents).

Korean Office Action dated Sep. 30, 2011, issued in corresponding Korean Patent Application No. 2008-0102337.

Chinese Office Action dated May 31, 2011, issued in corresponding Chinese Patent Application No. 200810170074.4.

"JIS Surface roughness—Definitions and Designation—JIS B 0601—1994" Japanese Standards Association, Feb. 1, 1994, revised, pp. 4 to 9 and pp. 17 to 27.

"JIS Surface roughness—Definitions and Indication—JIS B 0601—1982" Japanese Standards Association, Jun. 15, 1982, revised, pp. 2 to 7 and pp. 9 to 19.

Japanese Office Action dated Dec. 2, 2011, issued in corresponding Japanese Patent Application No. 2007-274045.

Japanese Office Action dated Feb. 10, 2012, issued in corresponding Japanese Patent Application No. 2007-274045.

Taiwanese Office Action dated May 14, 2012, issued in corresponding Taiwanese Patent Application No. 096130350, with English Translation (14 pages).

Hoshi et al., "ITO thin films deposited at low temperatures using a kinetic energy controlled sputter-deposition technique", Thin Solid Films, vol. 411, 2002, pp. 36-41. [The year of the publication is sufficiently earlier than the effective U.S. filed and any foreign priority date; see MPEP 609.04(a)(I)].

Noda et al., "Production of Transparent Conductive Films with Inserted SiO2 Anchor Layer, and Application to a Resistive Touch Panel", Electronics and Communications in Japan, Part 2, 2001, vol. 84, No. 7, pp. 39-45. [The year of the publication is sufficiently earlier than the effective U.S. filed and any foreign priority date; see MPEP 609.04(a)(I)].

Notice of Rejedction dated Aug. 30, 2012, issued in Korean Patent Application No. 10-2008-0102337, with English translation (5 pages).

Submission of Information form, receipt date of Feb. 9, 2012, filed in related Japanese patent No. 2007-274045.

Japanese Office Action dated Apr. 24, 2012, issued in corresponding Japanese Patent Application No. 2007-274045, English translation, (4 pages).

U.S. Office Action dated Oct. 24, 2012 cited in copending U.S. Appl. No. 13/538,893 (16 pp).

U.S. Office Action dated Nov. 5, 2013, issued in corresponding U.S. Appl. No. 13/538,893.

U.S. Final Office Action dated Jul. 1, 2014, issued in related U.S. Appl. No. 13/538,893 (8 pages).

Korean Office Action dated Jun. 18, 2014, issued in corresponding Korean Patent Application No. 10-2012-0105797 with English translation (6 pages).

Japanese Office Action dated Dec. 3, 2013, in corresponding Japanese Application No. 2012-152769 with English Translation. (6 pages).

Korean Office Action dated Dec. 13, 2013, in corresponding Korean Application No. 2012-0105797 with English Translation. (8 pages).

\* cited by examiner

TRANSPARENT CONDUCTIVE FILM, METHOD FOR PRODUCTION THEREOF AND TOUCH PANEL THEREWITH

BACKGROUND OF THE INVENTION

1. Field of the Invention

The present invention relates to a transparent conductive film that has transparency in the visible light range and includes a film substrate and a transparent conductor layer provided on the substrate with an undercoat layer interposed therebetween, and also to a method for production thereof. The invention also relates to a touch panel including the transparent conductive film.

The transparent conductive film of the present invention may be used for transparent electrodes in touch panels and display systems such as liquid crystal displays and electroluminescence displays and also used for electromagnetic wave shielding or prevention of static charge of transparent products. In particular, the transparent conductive film of the present invention is preferably used for touch panels. The transparent conductive film of the invention is particularly suitable for use in resistive film type touch panels.

2. Description of the Related Art

Touch panels may be classified according to a position sensing method into an optical type, an ultrasonic type, a capacitive type, a resistive film type, and the like. Resistive film type touch panels are configured to include a pair of transparent conductive films arranged opposite to each other with spacers interposed therebetween, in which an electric current is allowed to flow through an upper transparent conductive film, while a voltage at a lower transparent conductive film is measured. When the upper transparent conductive film is brought into contact with the lower transparent conductive film by pressing with a finger, a pen or the like, the electric current flows through the contact portion so that the position of the contact portion is detected. Therefore, the transparent conductive films are required to have pen input durability.

In recent years, therefore, various types of plastic films such as polyethylene terephthalate films have been used as a substrate of such transparent conductive films, because of their advantages such as good impact resistance and light weight as well as flexibility and workability. Touch panels including such transparent conductive films are frequently used outdoors. Therefore, the transparent conductive films are required to have high-temperature, high-humidity reliability as well as pen input durability.

Incidentally, it is proposed that a transparent conductive film should include a transparent conductor layer with a controlled thickness of 12 to 2 nm, a controlled maximum surface roughness of 1 to 20 nm and a controlled average surface roughness of 0.1 to 10 nm (WO 2004/105055 Pamphlet). It is also proposed that the transparent conductive film should include two transparent conductor layers such that the surface roughness Ra may be controlled to be 0.5 to 2.0 nm and that the maximum height Ry may be controlled to be 8 to 20 nm (Japanese Patent Application Laid-Open (JP-A) No. 2005-268616). It is also proposed that the transparent conductive film should include a transparent conductor layer whose center line-average roughness Ra, ten-point-average roughness Rz and maximum height Ry are adjusted to 1 nm or less, 10 nm or less, and 10 nm or less, respectively, by polishing (Japanese Patent Application Laid-Open (JP-A) No. 2005-93318). WO 2004/105055 Pamphlet discloses that the transparent conductor layer may be obtained in a form of a very thin continuous film. Japanese Patent Application Laid-Open (JP-A) No. 2005-268616 discloses that the transparent conductor layer has low resistance and high surface smoothness. Japanese Patent Application Laid-Open (JP-A) No. 2005-93318 discloses that the surface of the transparent conductor layer has high smoothness. However, the transparent conductor layer described in each of the above documents does not provide both pen input durability and high-temperature, high-humidity reliability.

SUMMARY OF THE INVENTION

It is an object of the present invention to provide a transparent conductive film having a transparent conductor layer with a high level of pen input durability and high-temperature, high-humidity reliability and to provide a method for production thereof. It is another object of the invention to provide a touch panel including such a transparent conductive film.

As a result of investigations for solving the problems, the inventors of the present invention have found that the objects can be achieved using the features described below, and finally completed the invention.

Namely, the transparent conductive film of the present invention is a transparent conductive film, comprising: a transparent film substrate; a transparent conductor layer that is provided on one side of the transparent film substrate and has a thickness d of 15 nm to 35 nm and an average surface roughness Ra of 0.37 nm to 1 nm; and at least a single layer of an undercoat layer interposed between the transparent film substrate and the transparent conductor layer.

In the above, it is preferable that the ratio (Ra/d) of the average surface roughness Ra to the thickness d is from 0.017 to 0.045.

In the above, it is preferable that the transparent conductor layer has a maximum surface roughness Ry of 7.5 nm to 15 nm.

In the above, it is preferable that the ratio (Ry/d) of the maximum surface roughness Ry to the thickness d is from 0.34 to 1.

In the above, it is preferable that a first undercoat layer that is formed on the transparent film substrate side is made of an organic material.

In the above, it is preferable that there are at least two layers of the undercoat layers and at least the undercoat layer most distant from the transparent film substrate side is made of an inorganic material. It is preferable that the undercoat layer made of the inorganic material is a $SiO_2$ film.

In the above, it is preferable that the transparent conductive film further comprises a transparent substrate that is bonded to the other side of the transparent film substrate with a transparent pressure-sensitive adhesive layer interposed therebetween.

In the above, it is preferable that the transparent conductive film is for use in a touch panel. It is preferable that the touch panel is a resistive film type touch panel.

Also, the method for producing a transparent conductive film of the present invention is a method for producing the above-mentioned transparent conductive film, comprising the steps of: forming at least a single layer of an undercoat layer on one side of a transparent film substrate; and forming a transparent conductor layer on the undercoat layer by sputtering a target under a discharge power condition of 4 $W/cm^2$ to 7 $W/cm^2$.

In the above, it is preferable that the method further comprises a step of performing annealing treatment to crystallize at a temperature of 120° C. to 160° C. after the step of forming the transparent conductor layer.

Also, the touch panel of the present invention is a touch panel, comprising the above-mentioned transparent conductive film.

In the transparent conductive film of the present invention, the thickness d and the average surface roughness Ra of the transparent conductor layer are each controlled to fall within a specific range. According to the invention, such control of the transparent conductor layer allows the production of a transparent conductive film with a high level of pen input durability and high-temperature, high-humidity reliability. According to the invention, it has also been found that when the transparent conductor layer is formed by sputtering at a discharge power controlled within a specific range in the process of manufacturing the transparent conductive film, the average surface roughness Ra can easily increase relative to the thickness d, as compared with when the discharge power is low. Such a manufacturing method allows an efficient formation of a transparent conductor layer with a satisfactory level of the thickness d and the average surface roughness Ra according to the invention. The resulting transparent conductive film is suitable for use in touch panels and particularly suitable for use in resistive film type touch panels.

DETAILED DESCRIPTION OF THE PREFERRED EMBODIMENTS

Figure 1:
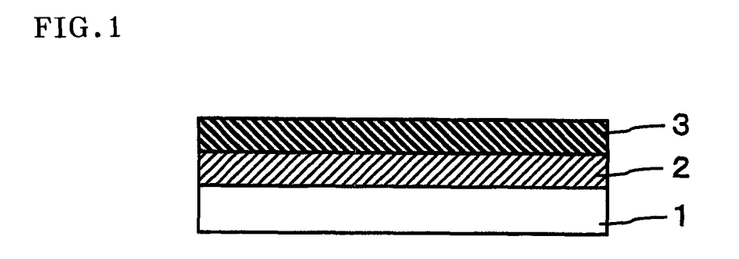
FIG. 1 is a cross-sectional view showing a transparent conductive film according to an embodiment of the invention.
Figure 2:
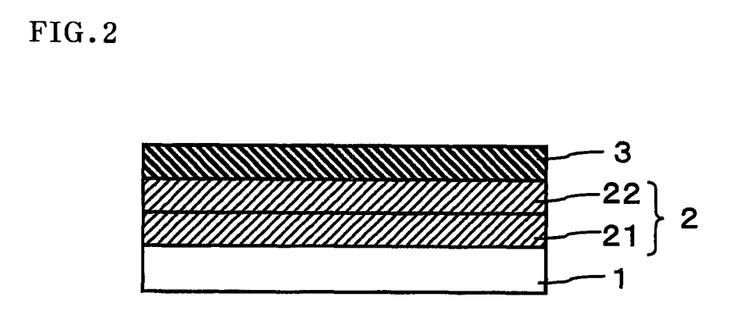
FIG. 2 is a cross-sectional view showing a transparent conductive film according to an embodiment of the invention.

Embodiments of the present invention are described below with reference to the drawings. FIG. 1 is a cross-sectional view showing an example of the transparent conductive film of the invention. The transparent conductive film of FIG. 1 includes a transparent film substrate 1 and a transparent conductor layer 3 provided on one side of the substrate 1 with an undercoat layer 2 interposed therebetween. The transparent conductive film of FIG. 2 includes two undercoat layers (indicated by 2). In FIG. 2, undercoat layers 21 and 22 are formed in this order from the transparent film substrate 1 side.

Figure 3:
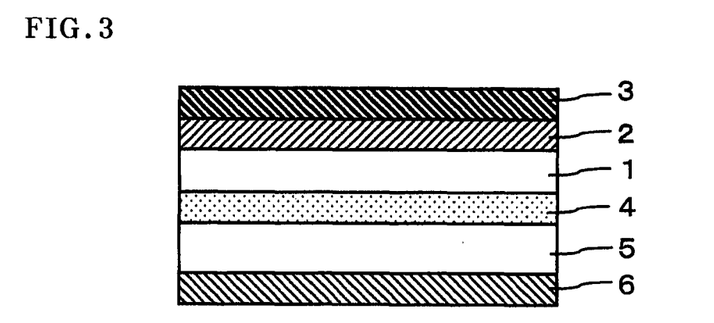
FIG. 3 is a cross-sectional view showing a transparent conductive film according to an embodiment of the invention.

As shown in FIG. 3, a transparent substrate 5 may also be bonded to the other side (where the transparent conductor layer 3 is not provided) of the transparent film substrate 1 of the transparent conductive film with a transparent pressure-sensitive adhesive layer 4 interposed therebetween. The transparent substrate 5 may be made of a single substrate film or a laminate of two or more substrate films (with transparent pressure-sensitive adhesive layer(s) interposed therebetween). FIG. 3 also shows a case where a hard coat layer (resin layer) 6 is provided on an outer surface of the transparent substrate 5.

There is no particular limitation to the film substrate 1, and various types of plastic films having transparency may be used. Examples of the material for the film substrate 1 include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polycarbonate resins, and polyolefin resins are preferred.

Examples thereof also include polymer films as disclosed in JP-A No. 2001-343529 (WO01/37007) and a resin composition that contains (A) a thermoplastic resin having a side chain of a substituted and/or unsubstituted imide group and (B) a thermoplastic resin having a side chain of substituted and/or unsubstituted phenyl and nitrile groups. Specifically, a polymer film of a resin composition containing an alternating copolymer made of isobutylene and N-methylmaleimide, and an acrylonitrile-styrene copolymer may be used.

The thickness of the film substrate 1 is preferably in the range of 2 to 200 μm, more preferably in the range of 2 to 100 μm. If the thickness of the film substrate 1 is less than 2 μm, the film substrate 1 can have insufficient mechanical strength so that it can be difficult to use the film substrate 1 in the form of a roll in the process of continuously forming the undercoat layer 2 and the transparent conductor layer 3 in some cases. If the thickness exceeds 200 μm, it can be impossible to improve the scratch resistance of the transparent conductor layer 3 or the tap properties thereof for touch panels in some cases.

The surface of the film substrate 1 may be previously subject to sputtering, corona discharge treatment, flame treatment, ultraviolet irradiation, electron beam irradiation, chemical treatment, etching treatment such as oxidation, or undercoating treatment such that the adhesion of the undercoat layer 2 formed thereon to the film substrate 1 can be improved. If necessary, the film substrate may also be subjected to dust removing or cleaning by solvent cleaning, ultrasonic cleaning or the like, before the undercoat layer 2 is formed.

The undercoat layer 2 may be made of an inorganic material, an organic material or a mixture of inorganic and organic materials. The undercoat layer 2 generally has a refractive index of 1.3 to 2.5, preferably of 1.38 to 2.3, and more preferably of 1.4 to 2.3. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses indicates the light refractive index of each material. In particular, $SiO_2$, $MgF_2$, $Al_2O_3$ or the like is preferably used, and $SiO_2$ is particularly preferred. Besides the above, a complex oxide may also be used that comprises about 10 to about 40 parts by weight of cerium oxide and 0 to about 20 parts by weight of tin oxide based on indium oxide.

Examples of the organic material include acrylic resins, urethane resins, melamine resins, alkyd resins, siloxane polymers, and organosilane condensates. At least one selected from the above organic materials may be used. In particular, a thermosetting resin comprising a mixture of a melamine resin, an alkyd resin and an organosilane condensate is preferably used as the organic material.

The undercoat layer 2 is provided between the transparent film substrate 1 and the transparent conductor layer 3 and does not function as a conductor layer. Specifically, the undercoat layer 2 is provided as a dielectric layer. Therefore, the undercoat layer 2 generally has a surface resistance of $1\times10^6$ Ω/square or more, preferably of $1\times10^7$ Ω/square or more, and more preferably of $1 \times 10^8$ Ω/square or more. Here, the surface resistance of the undercoat layer 2 does not have any particular upper limit. While the surface resistance of the undercoat layer 2 may generally has an upper limit of about $1 \times 10^{13}$ Ω/square, which corresponds to a measuring limit, it may be higher than $1 \times 10^{13}$ Ω/square.

In view of productivity and flexibility, a first undercoat layer formed on the transparent film substrate 1 side is preferably made of an organic material. Therefore, when the undercoat layer 2 is a single layer, the undercoat layer 2 is preferably made of an organic material. When the undercoat layer 2 is composed of at least two layers, at least a layer that is most distant from the transparent film substrate 1 is preferably made of an inorganic material in terms of pen input durability.

When the undercoat layer 2 is composed of three or more layers, a layer or layers that are above the second layer from the transparent film substrate 1 are also preferably made of an inorganic material.

The undercoat layer made of an inorganic material may be formed by a dry process such as vacuum deposition, sputtering, and ion plating or a wet process (coating). The inorganic material for forming the undercoat layer is preferably $SiO_2$ as described above. In a wet process, a silica sol or the like may be applied to form a $SiO_2$ film.

Under the foregoing, when two layers of the undercoat layers 2 are formed, it is preferred that the first undercoat layer 21 should be made of an organic material and that the second undercoat layer 22 should be made of an inorganic material.

The thickness of the undercoat layer 2 is generally, but not limited to, from about 1 to about 300 nm, preferably from 5 to 300 nm, in view of optical design and the effect of preventing oligomer production from the film substrate 1. When two or more undercoat layers 2 are formed, the thickness of each layer may be from about 5 to about 250 nm, preferably from 10 to 250 nm.

Examples of materials that may be used to form the transparent conductor layer 3 include, but are not limited to, oxides of at least one metal selected from the group consisting of indium, tin, zinc, gallium, antimony, titanium, silicon, zirconium, magnesium, aluminum, gold, silver, copper, palladium, and tungsten. Such metal oxides may be optionally doped with any metal atom selected from the above group. For example, indium oxide doped with tin oxide or tin oxide doped with antimony is preferably used. The refractive index of the transparent conductor layer 3 is generally about from 1.95 to about 2.05.

The thickness d of the transparent conductor layer 3 is from 15 to 35 nm. When the thickness d is controlled to fall within this range, pen input durability and high-temperature, high-humidity reliability can be achieved, and the transparent conductor layer 3 can be formed as a continuous coating with good electrical conductivity and a surface resistance of $1 \times 10^3$ Ω/square or less. If the thickness d is less than 15 nm, pen input durability and high-temperature, high-humidity reliability cannot be achieved. If the thickness d is more than 35 nm, the layer can be so thick that the transparency may be reduced, and cracks can be easily formed to reduce pen input durability, which is not so preferred. The thickness d is preferably from 17 to 35 nm, and more preferably from 17 to 30 nm.

The transparent conductor layer 3 has an average surface roughness Ra of 0.37 to 1 nm. The control of the average surface roughness Ra within this range gives pen input durability. If the average surface roughness Ra is less than 0.37 nm, pen input durability cannot be achieved even with the thickness d falling within the range. On the other hand, if the average surface roughness Ra is more than 1 nm, high-temperature, high-humidity reliability cannot be achieved even with the thickness d falling within the range, which is not preferred. The average surface roughness Ra is preferably from 0.37 to 0.95 nm, more preferably from 0.37 to 0.9 nm.

Concerning the relationship between the thickness d and the average surface roughness Ra of the transparent conductor layer, the inventors have also found that controlling the ratio (Ra/d) of the average surface roughness Ra to the thickness d within a specific range contributes to achievement of both pen input durability and high-temperature, high-humidity reliability. Specifically, in the transparent conductor layer, the ratio (Ra/d) of the average surface roughness Ra to the thickness d is preferably from 0.017 to 0.045 in order to achieve pen input durability and high-temperature, high-humidity reliability. The ratio (Ra/d) is more preferably from 0.017 to 0.043, and even more preferably from 0.017 to 0.04.

The transparent conductor layer preferably has a maximum surface roughness Ry of 7.5 to 15 nm in order to achieve pen input durability and high-temperature, high-humidity reliability. The maximum surface roughness Ry is more preferably from 7.5 to 14 nm, and even more preferably from 7.5 to 13 nm.

Concerning the relationship between the thickness d and the maximum surface roughness Ry of the transparent conductor layer, the inventors have also found that controlling the ratio (Ry/d) of the maximum surface roughness Ry to the thickness d within a specific range contributes to achievement of both pen input durability and high-temperature, high-humidity reliability. Specifically, in the transparent conductor layer, the ratio (Ry/d) of the maximum surface roughness Ry to the thickness d is preferably from 0.34 to 1 in order to achieve pen input durability and high-temperature, high-humidity reliability. The ratio (Ry/d) is more preferably from 0.34 to 0.9, even more preferably from 0.34 to 0.8.

The transparent conductor layer 3 may be formed by any method capable of satisfying the thickness d and average surface roughness Ra range requirements, examples of which include a vacuum deposition method, a sputtering method, and an ion plating method. In particular, a sputtering method is preferred in view of productivity and uniformity. The sputtering method may include sputtering a target to deposit the transparent conductor layer 3 on the undercoat layer 2.

The target may be any of a metal oxide target and a metal target. In the invention, a metal oxide target is preferably used. The metal oxide target to be used is preferably a sintered material. Here, when the material for constituting the transparent conductor layer is tin oxide-doped indium oxide, tin oxide-indium oxide may be used as a metal oxide target, or a tin-indium alloy may be used as a metal target. Here, sintered tin oxide-indium oxide is preferably used as a metal oxide target.

The sputtering method may use any of a method of performing sputtering under an argon gas atmosphere mainly composed of argon gas and a method of performing reactive sputtering under an oxygen-containing argon gas atmosphere. In the case of the former sputtering method, a metal oxide target should be used. On the other hand, in the case of the latter reactive sputtering method, a metal oxide target or a metal target should be used. The invention preferably uses a reactive sputtering method, and in particular, preferably uses the reactive sputtering method with a metal oxide target (preferably a sintered material). Here, in the reactive sputtering method, the content of the oxygen gas in the argon gas atmosphere may be from about 0.2 to 5% by volume, preferably from 0.2 to 3% by volume, based on the volume of the argon gas.

The sputtering method is preferably performed under a discharge power condition of 4 to 7 W/cm$^2$, in order to form the transparent conductor layer 3 with the thickness d and the average surface roughness Ra each falling within the above range. If the discharge power is less than 4 W/cm$^2$, there is a case where irregularities could not be sufficiently formed. If the discharge power is more than 7 W/cm$^2$, there is a case where nodules could be produced on the target surface so that stable discharge could be impossible. The discharge power is more preferably from 4 to 6.8 W/cm$^2$, and even more preferably from 4 to 6.5 W/cm$^2$. In addition, the sputtering method is preferably performed with the transparent film substrate 1 heated at a temperature of 80 to 160° C. in order to form the transparent conductor layer 3 with the thickness d and the average surface roughness Ra each falling within the above range. Examples of means for heating the transparent film substrate include such as a heating roll and an IR heater. If the transparent film substrate is heated at a temperature less than 80° C., there is a case where irregularities could not be sufficiently formed, and high durability could not be provided. Here, the upper limit of the temperature, 160° C., is determined from the highest temperature which the transparent film substrate can withstand. The transparent film substrate 1 is preferably heated at a temperature of 80 to 150° C., and more preferably of 90 to 150° C.

The sputtering method may also be performed under the atmospheric pressure or reduced pressure. The pressure is generally from about 0.01 to 1 Pa, and preferably from 0.1 to 0.6 Pa.

After the transparent conductor layer 3 is formed, if necessary, annealing treatment may be performed to crystallize at a temperature in the range of 120 to 160° C. The annealing temperature is preferably from 130 to 155° C. Therefore, the film substrate 1 preferably has a heat resistance of 100° C. or more, and more preferably of 150° C. or more. In addition, the crystallization is preferably performed for 0.5 to 5 hours, and more preferably for 0.5 to 4 hours.

A transparent substrate 5 may also be bonded to the side of the film substrate 1 where the transparent conductor layer 3 is not provided, with the transparent pressure-sensitive adhesive layer 4 interposed therebetween. The transparent substrate 5 may be a composite structure including at least two transparent substrate films bonded with transparent pressure-sensitive adhesive layer(s).

In general, the thickness of the transparent substrate 5 is preferably from 90 to 300 μm and more preferably controlled to be from 100 to 250 μm. When the transparent substrate 5 is composed of a plurality of substrate films, the thickness of each substrate film is preferably from 10 to 200 μm, more preferably from 20 to 150 μm, and may be controlled such that the total thickness of the transparent substrate 5 including these substrate films and a transparent pressure-sensitive adhesive layer(s) can fall within the above range. Examples of the substrate film may include those described above for the film substrate 1.

The film substrate 1 and the transparent substrate 5 may be bonded by a process including the steps of forming the pressure-sensitive adhesive layer 4 on the transparent substrate 5 side and bonding the film substrate 1 thereto or by a process including the steps of forming the pressure-sensitive adhesive layer 4 contrarily on the film substrate 1 side and bonding the transparent substrate 5 thereto. The latter process is more advantageous in view of productivity, because it enables continuous production of the pressure-sensitive adhesive layer 4 with the film substrate 1 in the form of a roll. Alternatively, the transparent substrate 5 may be formed on the film substrate 1 by sequentially laminating a plurality of substrate films with the pressure-sensitive adhesive layers. The transparent pressure-sensitive adhesive layer for use in laminating the substrate films may be made of the same material as the transparent pressure-sensitive adhesive layer 4 described below. When the transparent conductive films are bonded to each other, appropriate transparent conductive films on which the transparent pressure-sensitive adhesive layer 4 is laminated may be selected and the transparent conductive films are bonded to each other.

Any transparent pressure-sensitive adhesive may be used for the pressure-sensitive adhesive layer 4 without limitation. For example, the pressure-sensitive adhesive may be appropriately selected from adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and good weather or heat resistance and exhibit suitable wettability and adhesion properties such as cohesiveness and adhesiveness.

The anchoring strength can be improved using an appropriate pressure-sensitive adhesive primer, depending on the type of the pressure-sensitive adhesive as a material for forming the pressure-sensitive adhesive layer 4. In the case of using such a pressure-sensitive adhesive, therefore, a certain pressure-sensitive adhesive primer is preferably used.

The pressure-sensitive adhesive primer may be of any type as long as it can improve the anchoring strength of the pressure-sensitive adhesive. For example, the pressure-sensitive adhesive primer that may be used is a so-called coupling agent such as a silane coupling agent having a hydrolyzable alkoxysilyl group and a reactive functional group such as amino, vinyl, epoxy, mercapto, and chloro in the same molecule; a titanate coupling agent having an organic functional group and a titanium-containing hydrolyzable hydrophilic group in the same molecule; and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, a silane coupling agent-containing layer is preferred, because it is easy to handle industrially.

The pressure-sensitive adhesive layer 4 may contain a crosslinking agent depending on the base polymer. If necessary, the pressure-sensitive adhesive layer 4 may also contain appropriate additives such as natural or synthetic resins, glass fibers or beads, or fillers comprising metal powder or any other inorganic powder, pigments, colorants, and antioxidants. The pressure-sensitive adhesive layer 4 may also contain transparent fine particles so as to have light diffusing ability.

The transparent fine particles to be used may be one or more types of appropriate conductive inorganic fine particles of silica, calcium oxide, alumina, titania, zirconia, tin oxide, indium oxide, cadmium oxide, antimony oxide, or the like with an average particle size of 0.5 to 20 μm or one or more types of appropriate crosslinked or uncrosslinked organic fine particles of an appropriate polymer such as poly(methyl methacrylate) and polyurethane with an average particle size of 0.5 to 20 μm.

The pressure-sensitive adhesive layer 4 is generally formed using a pressure-sensitive adhesive solution that includes a base polymer or a composition thereof dissolved or dispersed in a solvent and has a solid content concentration of about 10 to 50% by weight. An organic solvent such as toluene or ethyl acetate, water or the like may be appropriately selected depending on the type of the pressure-sensitive adhesive and used as the solvent.

After the bonding of the transparent substrate 5, for example, the pressure-sensitive adhesive layer 4 has a cushion effect and thus can function to improve the scratch resistance of the transparent conductor layer formed on one side of the film substrate 1 or to improve the tap properties thereof for touch panels, such as so called pen input durability and surface pressure durability. In terms of performing this function better, it is preferred that the elastic modulus of the pressure-sensitive adhesive layer 4 is set in the range of 1 to 100 N/cm$^2$ and that its thickness is set at 1 μm or more, generally in the range of 5 to 100 μm. If the thickness is as described above, the effect can be sufficiently produced, and the adhesion between the transparent substrate 5 and the film substrate 1 can also be sufficient. If the thickness is lower than the above range, the durability or adhesion cannot be sufficiently ensured. If the thickness is higher than the above range, outward appearances such as transparency can be degraded. Here, in other aspects, the elastic modulus and the thickness of the pressure-sensitive adhesive layer 4 to be applied to the transparent conductive film may be the same as those described above.

If the elastic modulus is less than 1 N/cm$^2$, the pressure-sensitive adhesive layer 4 can be inelastic so that the pressure-sensitive adhesive layer 4 can easily deform by pressing to make the film substrate 1 irregular and further to make the transparent conductor layer 3 irregular. If the elastic modulus is less than 1 N/cm$^2$, the pressure-sensitive adhesive can be easily squeezed out of the cut section, and the effect of improving the scratch resistance of the transparent conductor layer 3 or improving the tap properties of the transparent conductor layer 3 for touch panels can be reduced. If the elastic modulus is more than 100 N/cm$^2$, the pressure-sensitive adhesive layer 4 can be hard, and the cushion effect cannot be expected, so that the scratch resistance of the transparent conductor layer 3 or the pen input durability and surface pressure durability of the transparent conductor layer 3 for touch panels tends to be difficult to be improved.

If the thickness of the pressure-sensitive adhesive layer 4 is less than 1 μm, the cushion effect also cannot be expected so that the scratch resistance of the transparent conductor layer 3 or the pen input durability and surface pressure durability of the transparent conductor layer 3 for touch panels tends to be difficult to be improved. If it is too thick, it can reduce the transparency, or it can be difficult to obtain good results on the formation of the pressure-sensitive adhesive layer 4, the bonding workability of the transparent substrate 5, and the cost.

The transparent substrate 5 bonded through the pressure-sensitive adhesive layer 4 as described above imparts good mechanical strength to the film substrate 1 and contributes to not only the pen input durability and the surface pressure durability but also the prevention of curling.

The pressure-sensitive adhesive layer 4 may be transferred using a separator. In such a case, for example, the separator to be used may be a laminate of a polyester film of a migration-preventing layer and/or a release layer, which is provided on a polyester film side to be bonded to the pressure-sensitive adhesive layer 4.

The total thickness of the separator is preferably 30 μm or more, more preferably in the range of 60 to 100 μm. This is to prevent deformation of the pressure-sensitive adhesive layer 4 (dents) in a case where the pressure-sensitive adhesive layer 4 is formed and then stored in the form of a roll, in which the deformation (dents) can be expected to be caused by foreign particles or the like intruding between portions of the rolled layer.

The migration-preventing layer may be made of an appropriate material for preventing migration of migrant components in the polyester film, particularly for preventing migration of low molecular weight oligomer components in the polyester. An inorganic or organic material or a composite of inorganic and organic materials may be used as a material for forming the migration-preventing layer. The thickness of the migration-preventing layer may be set in the range of 0.01 to 20 μm as needed. The migration-preventing layer may be formed by any method such as coating, spraying, spin coating, and in-line coating. Vacuum deposition, sputtering, ion plating, spray thermal decomposition, chemical plating, electroplating, or the like may also be used.

The release layer may be made of an appropriate release agent such as a silicone release agent, a long-chain alkyl release agent, a fluorochemical release agent, and a molybdenum sulfide release agent. The thickness of the release layer may be set as appropriate in view of the release effect. In general, the thickness is preferably 20 μm or less, more preferably in the range of 0.01 to 10 μm, particularly preferably in the range of 0.1 to 5 μm, in view of handleability such as flexibility. A production method of the release layer is not particularly limited, and may be formed in the same manner as in the case of the migration-preventing layer.

An ionizing radiation-curable resin such as an acrylic resin, a urethane resin, a melamine resin, and an epoxy resin or a mixture of the above resin and aluminum oxide, silicon dioxide, mica, or the like may be used in the coating, spraying, spin coating, or in-line coating method. When the vacuum deposition, sputtering, ion plating, spray thermal decomposition, chemical plating, or electroplating method is used, a metal such as gold, silver, platinum, palladium, copper, aluminum, nickel, chromium, titanium, iron, cobalt, or tin or an oxide of an alloy thereof or any other metal compounds such as metal iodides may be used.

If necessary, a hard coat layer (resin layer) 6 for protecting the outer surface may be formed on the outer surface of the transparent substrate 5 (on the side opposite to the pressure-sensitive adhesive layer 4). For example, the hard coat layer 6 is preferably made of a cured coating film of a curable resin such as a melamine resin, a urethane resin, an alkyd resin, an acrylic resin, and a silicone resin. The hard coat layer 6 preferably has a thickness of 0.1 to 30 μm. If its thickness is less than 0.1 μm, its hardness can be inadequate. If its thickness exceeds 30 μm, the hard coat layer 6 can be cracked, or curling can occur in the whole of the transparent substrate 5.

The transparent conductive film of the present invention may be provided with an antiglare layer or an antireflection layer for the purpose of increasing visibility. When the transparent conductive film is used for a resistive film type touch panel, an antiglare layer or an antireflection layer may be formed on the outer surface of the transparent substrate 5 (on the side opposite to the pressure-sensitive adhesive layer 4) similarly to the hard coat layer 6. An antiglare layer or an antireflection layer may also be formed on the hard coat layer 6. On the other hand, when the transparent conductive film is used for a capacitive type touch panel, an antiglare layer or an antireflection layer may be formed on the transparent conductor layer 3.

For example, the material to be used to form the antiglare layer may be, but not limited to, an ionizing radiation-curable resin, a thermosetting resin, a thermoplastic resin, or the like. The thickness of the antiglare layer is preferably from 0.1 to 30 μm.

The antireflection layer may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 2.35), which is formed on the hard coat layer 6, and a low-refractive-index silicon oxide layer (refractive index: about 1.46), which is formed on the titanium oxide layer. Also preferred is a four-layer laminate which comprises the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

For example, the transparent conductive film of the present invention is suitable for use in optical type, ultrasonic type, capacitive type, or resistive film type touch panels. In particular, the transparent conductive film of the invention is suitable for use in resistive film type touch panels.

EXAMPLES

The invention is more specifically described with some examples below. It will be understood that the invention is not limited to the examples below without departing from the gist of the invention. In each example, the term "part or parts" means part or parts by weight, unless otherwise stated.

Refractive Index

The refractive index of each layer was measured with a measuring beam incident on the measurement surface of each object in an Abbe refractometer manufactured by Atago Co., Ltd., according the measurement method specified for the refractometer.

Thickness of Each Layer

The thickness of the layer with a thickness of at least 1 μm, such as the film substrate, the transparent substrate, the hard coat layer, and the pressure-sensitive adhesive layer, was measured with a microgauge type thickness gauge manufactured by Mitutoyo Corporation. The thickness of the layer whose thickness was difficult to directly measure, such as the hard coat layer and the pressure-sensitive adhesive layer, was calculated by subtracting the thickness of the substrate from the measured total thickness of the substrate and each layer formed thereon.

The thickness of the undercoat layer or the transparent conductor layer was calculated using an instantaneous multichannel photodetector system MCPD-2000 (trade name) manufactured by Otsuka Electronics Co., Ltd., based on the waveform data of the resulting interference spectrum.

Example 1

Formation of Undercoat Layer

A thermosetting resin (with a light refractive index n of 1.54) composed of a melamine resin, an alkyd resin and an organosilane condensate (2:2:1 in weight ratio) was used to form a first undercoat layer having a thickness of 185 nm on one side of a film substrate made of a polyethylene terephthalate film (hereinafter referred to as "PET film") having a thickness of 25 μm. Then a silica sol (Colcoat P, manufactured by Colcoat Co., Ltd.) was diluted with ethanol to a solid content concentration of 2% by weight. The diluted silica sol was applied to the first undercoat layer by a silica coating method and then dried and cured at 150° C. for 2 minutes to form a second undercoat layer (a $SiO_2$ film with a light refractive index of 1.46) having a thickness of 33 nm.

Formation of Transparent Conductor Layer

While the PET film was heated at a temperature of 100° C., an ITO film (with a light refractive index of 2.00) having a thickness of 22 nm was formed on the second undercoat layer by a reactive sputtering method with a sintered material of 97% by weight of indium oxide and 3% by weight of tin oxide at a discharge power of 6.35 W/cm$^2$ in a 0.4 Pa atmosphere composed of 99% by volume of argon gas and 1% by volume of oxygen gas.

Formation of Hard Coat Layer

A toluene solution for use as a hard coat layer-forming material was prepared by adding 5 parts of hydroxycyclohexyl phenyl ketone (Irgacure 184, manufactured by Ciba Specialty Chemicals Inc.) for serving as a photopolymerization initiator to 100 parts of an acrylic urethane-based resin (Unidic 17-806, manufactured by DIC Corporation) and diluting the mixture to a concentration of 30% by weight.

The hard coat layer-forming material was applied to one side of a transparent substrate made of a PET film having a thickness of 125 μm and dried at 100° C. for 3 minutes. The coating was then immediately irradiated with light from two ozone-type high-pressure mercury lamps (80 W/cm$^2$ in energy density, 15 cm focused radiation) to form a hard coat layer having a thickness of 5 μm.

Preparation of Transparent Conductive Film

A transparent acrylic-based pressure-sensitive adhesive layer with a thickness of about 20 μm and an elastic modulus of 10 N/cm$^2$ was then formed on the surface of the transparent substrate opposite to the surface where the hard coat layer was formed. A mixture of 100 parts of an acrylic-based copolymer of butyl acrylate, acrylic acid and vinyl acetate (100:2:5 in weight ratio) and 1 part of an isocyanate-based crosslinking agent was used as a composition of the pressure-sensitive adhesive layer. The film substrate (the surface on which the transparent conductor layer was not formed) was bonded to the pressure-sensitive adhesive layer side to form a transparent conductive film.

Crystallization of the Transparent Conductor Layer

After the transparent conductive film was prepared, heat treatment was performed at 140° C. for 90 minutes so that the ITO film was crystallized.

Preparation of Touch Panel

The transparent conductive film was used as one of the panel plates, and a glass plate on which an ITO thin film having a thickness of 30 nm was formed was used as the other panel plate. Both panel plates were arranged opposite to each other with spacers having a thickness of 10 μm interposed therebetween in such a manner that the ITO thin films faced each other, so that a touch panel for serving as a switch structure was prepared.

Examples 2 to 4 and Comparative Examples 1 to 4

Transparent conductive films were prepared using the process of Example 1, except that the temperature at which the PET film was heated, the discharge power, and the thickness of the transparent conductor layer was changed as shown in Table 1 when the transparent conductor layer was formed. Further, in the same manner as in Example 1, the ITO film of the transparent conductive film was crystallized, and then each touch panel was prepared.

The transparent conductive film and the touch panel (sample) prepared in each of Examples and Comparative Examples were evaluated as described below. The results are shown in Table 1.

Surface Characteristics of the Transparent Conductor Layer

AFM observation was performed with a scanning probe microscope (SPI 3800, manufactured by SII Nano Technology Inc.). The measurement was performed with a $Si_3N_4$ probe (0.09 N/m in spring constant) in the contact mode. The average surface roughness (Ra) and the maximum height (Ry) were determined by scanning a 1 μm² area.

Surface Resistance of ITO Film

The surface electric resistance (Ω/square) of the ITO film was measured using a two-terminal method.

Light Transmittance

The visible light transmittance was measured at a light wavelength of 550 nm using a spectroscopic analyzer UV-240 manufactured by Shimadzu Corporation.

Pen Input Durability

A polyacetal pen (0.8 mm in pen nib R) was allowed to slide 300,000 times under a load of 500 g on the panel plate surface formed of the transparent conductive film. After the sliding, the linearity (%) of the transparent conductive film was measured as described below, and the pen input durability was evaluated.

Method for Measuring Linearity

A voltage of 5 V was applied to the transparent conductive film, in which an output voltage was measured between a voltage-applied terminal A (measurement start point) and a terminal B (measurement end point).

The linearity was calculated from the formulae:

$E_{XX}$(theoretical value)=$\{X(E_B-E_A)/(B-A)\}+E_A$

Linearity (%)=$[(E_{xx}-E_x)/(E_B-E_A)]\times 100$, wherein $E_A$ is the output voltage at the measurement start point A, $E_B$ is the output voltage at the measurement end point B, $E_X$ is the output voltage at each measurement point X, and $E_{XX}$ is the theoretical value.

Figure 4:
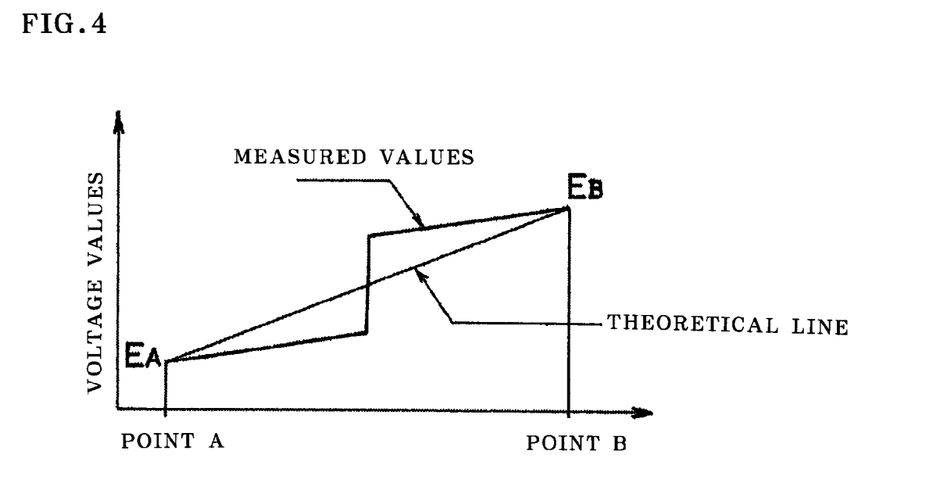
FIG. 4 is a schematic diagram showing an outline of measurement of linearity.

The outline of the measurement of the linearity is shown in FIG. 4. In a touch panel-equipped image display, the position of the pen displayed on the screen is determined from a resistance value of a portion where an upper panel and a lower panel are brought into contact with each other by pressing with the pen. The resistance value is determined assuming that the output voltage is distributed on the surface of the upper and lower panels according to the theoretical line (ideal line). Accordingly, if the measured voltage value deviates from the theoretical line as shown in FIG. 4, the actual position of the pen will not well synchronize with the pen position on the screen that is determined from the resistance value. Such a deviation from the theoretical line corresponds to the linearity. The larger the linearity value, the larger the deviation of the actual pen position from the pen position on the screen.

Reliability in High-Temperature, High-Humidity Environment

The transparent conductive film obtained in each Example was named sample A. Sample A was left in an environment at 60° C. and 95% R.H. for 500 hours. After the treatment, the sample was named sample B. These samples were each measured for surface electric resistance (Ω/square) in the same manner as those described above, and the ratio ($R_B/R_A$) of the resistance ($R_B$) of the sample B to the resistance ($R_A$) of the sample A was calculated for evaluation of the reliability.

TABLE 1

| | Sputtering Conditions | | | | | | Evaluations | | | |
|---|---|---|---|---|---|---|---|---|---|---|
| | Film Temperature (° C.) | Discharge Power (W/cm²) | Transparent Conductor Layer | | | | Surface Resistance (Ω/square) | Light Transmittance (%) | Pen Input Durability | Reliability (Resistance Change Ratio) |
| | | | Thickness d (nm) | Surface Characteristics | | | | | (Linearity) (%) | |
| | | | | Ra (nm) | Ra/d | Ry (nm) | Ry/d | | | | |
| Example 1 | 100 | 6.35 | 22 | 0.80 | 0.036 | 12.60 | 0.57 | 300 | 90 | 1.0 | 1 |
| Example 2 | 100 | 5.33 | 22 | 0.50 | 0.022 | 11.50 | 0.52 | 300 | 90 | 1.0 | 1 |
| Example 3 | 100 | 4.44 | 22 | 0.45 | 0.020 | 10.80 | 0.49 | 300 | 90 | 1.0 | 1 |
| Example 4 | 100 | 4.13 | 22 | 0.40 | 0.018 | 9.00 | 0.41 | 300 | 90 | 1.5 | 1 |
| Comparative Example 1 | 40 | 4.44 | 22 | 0.35 | 0.016 | 7.00 | 0.32 | 300 | 90 | 2.0 | 1 |
| Comparative Example 2 | 100 | 3.81 | 22 | 0.30 | 0.014 | 6.81 | 0.31 | 300 | 90 | 2.5 | 1 |
| Comparative Example 3 | 100 | 3.17 | 22 | 0.30 | 0.014 | 6.56 | 0.30 | 300 | 90 | 3.0 | 1 |
| Comparative Example 4 | 100 | 6.35 | 12 | 0.40 | 0.033 | 6.50 | 0.54 | 800 | 91 | 50.0 | 2 |

What is claimed is:

1. A transparent conductive film, comprising:
   a transparent film substrate;
   a transparent conductor layer that is provided on one side of the transparent film substrate and has a thickness d of 15 nm to 35 nm and an average surface roughness Ra of 0.37 nm to 1 nm;
   at least a single layer of an undercoat layer interposed between the transparent film substrate and the transparent conductor layer;
   wherein the transparent conductor layer has a maximum surface roughness Ry of 7.5 nm to 15 nm,
   wherein in the transparent conductor layer, the ratio (Ry/d) of the maximum surface roughness Ry to the thickness d is from 0.34 to 1; and
   wherein in the transparent conductor layer, the ratio (Ra/d) of the average surface roughness Ra to the thickness d is from 0.017 to 0.045.

2. The transparent conductive film according to claim 1, wherein a first undercoat layer that is formed on the transparent film substrate side is made of an organic material.

3. The transparent conductive film according to claim 1, wherein there are at least two layers of the undercoat layers and at least the undercoat layer most distant from the transparent film substrate side is made of an inorganic material.

4. The transparent conductive film according to claim 3, wherein the undercoat layer made of the inorganic material is an $SiO_2$ film.

5. The transparent conductive film according to claim 1, further comprising a transparent substrate that is bonded to the other side of the transparent film substrate with a transparent pressure-sensitive adhesive layer interposed therebetween.

6. The transparent conductive film according to claim 1, wherein it is for use in a touch panel.

7. The transparent conductive film according to claim 6, wherein the touch panel is a resistive film type touch panel.

8. A method for manufacturing the transparent conductive film according to claim 1, comprising the steps of:
 forming at least a single layer of an undercoat layer on one side of a transparent film substrate; and
 forming a transparent conductor layer on the undercoat layer by sputtering a target under a discharge power condition of 4 $W/cm^2$ to 7 $W/cm^2$.

9. The method according to claim 8, further comprising a step of performing annealing treatment to crystallize at a temperature of 120° C. to 160° C. after the step of forming the transparent conductor layer.

10. A touch panel comprising the transparent conductive film according to claim 1.

* * * * *